April 18, 1967 L. E. WEST 3,315,088

READOUT OF PHASE CODED DATA

Filed Nov. 26, 1963 3 Sheets-Sheet 1

INVENTOR.
LLOYD ELWOOD WEST

BY Paul D. Carmichael

ATTORNEY

3,315,088
READOUT OF PHASE CODED DATA

Lloyd Elwood West, Lexington, Ky., assignor to International Business Machines Corporation, New York, N.Y., a corporation of New York Filed Nov. 26, 1963, Ser. No. 326,146
7 Claims. (Cl. 307—88)

This invention relates to the processing of binary data. In particular this invention relates to the reading from memory of binary data which is represented by the phase of electrical oscillations. The invention uses a parametron as an important element.

With the development of the parametron the processing of data by phase coded oscillations has become desirable in many applications. The parametron is a rugged device which contains no active elements. It is therefore potentially inexpensive and trouble free over extended periods of time. As is well known, the parametron amplifies small "seed" signals with power supplied by larger "excitation" frequencies. When amplification is begun, the parametron is self-sustaining. Since the phase of the "seed" signals is retained and the signal is amplified, the parametron functions as both a single bit register and an amplifier.

The prior art has many techniques for shifting and manipulating data. These techniques are generally directed, however, to processing of data represented by a single pulse. If the parametron, with all of its advantages, is to be used to greatest efficiency, it is necessary to develop circuits especially suited to the processing of phase coded data.

It is known that readout of data in phase code from a memory consisting of a matrix of magnetic cores can be accomplished with a reading signal of a given frequency. The magnetic cores in the memory each have a square hysteresis loop and are saturated in one direction to store a binary one and in the opposite direction to store a binary zero. A sense line links the cores. The readout signal is of a predetermined frequency and of a magnitude which will not reverse the saturation of the core. The coupling through the core to the sense line is thus effective only during one half cycle since the other half cycle drives the core further into saturation. The signal on the sense line is thus a modified multiplication of the reading signal. It contains a second harmonic of the reading frequency, and, very significantly, the phase of the second harmonic signal will differ by 180 degrees depending on whether the core stores a binary one or a binary zero.

An entire row or column in memory can be interrogated by a single reading signal linked to every core in the row or column being interrogated and by sense lines each individual to a single core in the row or column. Such a parallel reading technique is a useful one. It is necessary, however, to devise a technique to serialize this data for use in a system which does not function with parallel data. It would seem that this could be accomplished by use of a shift register. However, although the prior art teaches shift registers, it does not show a satisfactory way to enter parallel, phase coded data into the shift register from memory. Thus, readout techniques using the shift registers of the prior art are unsatisfactory.

It is an object of this invention to provide a parallel to serial converter for phase coded data which can receive the parallel data directly from a memory.

It is a more general object of this invention to provide an improved means to read phase coded data from a matrix core memory.

It is a more particular object of this invention to provide means to read phase coded data in parallel into a shift register and to shift the data serially to a single data utilization circuit.

It is a further object of this invention to provide a parallel memory interrogation and serial shift system with means to write the shifted information back into memory at locations corresponding to where the information has been shifted.

In accordance with the invention a shift register stage is provided for at least every bit position of a row or column of memory being interrogated. Each shift register stage comprises at least three substages: an input substage, an intermediate substage, and a shift control substage. The input substage can be a single parametron, seeded by the sense line in a single row or column and also seeded by lines from the shift control substage of a different stage of the shift register. Each intermediate substage can be a single parametron seeded by its associated input stage. The shift control substage is comprised of at least two parametrons, each seeded by the intermediate substage. Furthermore, both parametrons of the shift control substage are also connected to be seeded by a control signal. The two outputs of the two parametrons in the shift control substage are connected to seed the input substage of another stage. They are wound, however, so as to induce signals of opposite polarity when both shift control parametrons are oscillating at a phase induced by the control signal, but to induce additive signals when the two parametrons were seeded by the intermediate substage.

In operation the parametrons of the three substages are excited in discontinuous, overlapping time sequence in the order: input substage, intermediate substage, shift control substage, input substage, . . . and so on continually. When information is read from the memory, the control signal is caused to establish the phase of oscillations in the two parametrons of the shift control stages. The shift control substages, although connected to the input substages, are thus ineffective, since the two lines are poled to cancel. Signals from the sense lines therefore establish the phase of oscillations in the input substages. At a later time the shift control substages are no longer excited, but the intermediate substage is excited, and it oscillates in the phase of the signal in the input substage because the intermediate substage is seeded by the input substage. At a still later time the signal is extinguished in the input substage by extinguishing the excitation signal. The shift control substage is excited later. At that time the control is made ineffective so that it is the seed signal from the intermediate substage which establishes the phase at the oscillations induced. The two parametrons thus each oscillate in a phase which result in the addition of the signals at the input substage to which they are connected. Thus, when the input substage is next excited its phase is established by the two signals from a shift control substage, which combine to overcome any signal on the sense line. The signal established in the sense line when oscillations have built up can be used to write the shifted information directly into memory in accordance with well known techniques.

The inherent capability of this invention to simply and efficiently write shifted information back into memory gives rise to an important feature of the invention. That feature is the ability of the invention to interweave phase coded data. Data can be read out of one column of the memory in parallel and shifted one stage while a single bit is extracted. Each input substage links a memory row, and the presence of the shifted information in the input substage will be written into a magnetic core when the core is also driven by a second signal of twice the data frequency and of predetermined phase. Thus, the stored signal can also simultaneously function as the writing signal. The shifted information bits can be written back into the original memory column in parallel. Data is interwoven when a second column in the memory is read in parallel, shifted one stage while a single bit is extracted, and reinserted in parallel in the second column. The first column then can be read once again, and the information immediately brought to the bit extraction means is the next bit desired from the first column. By continuing this or similar operations it is possible to efficiently mingle words by character. This would be particularly useful in an arithmetic system where it is desired to sequentially add or otherwise operate upon the corresponding columns of two different binary numbers.

The foregoing and other objects, features and advantages of the invention will be apparent from the following more particular description of a preferred embodiment of the invention, as illustrated in the accompanying drawings.

Figure 1:
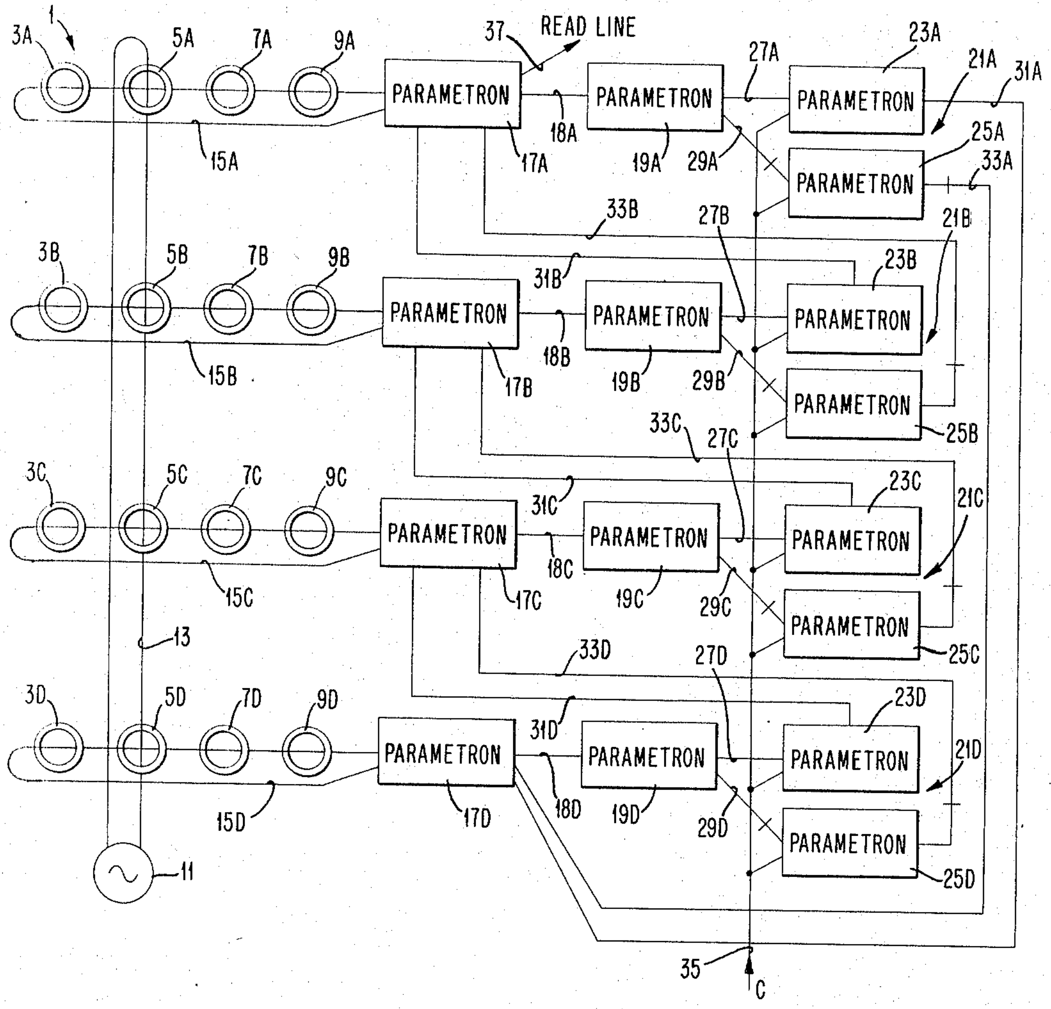
FIG. 1 shows the memory interrogation system of preferred embodiment and how the shift systems are interconnected among themselves and with a core memory.

For an understanding of the operation of the system as a whole, reference is made to FIG. 1. FIG. 1 shows a matrix of magnetic cores 1 made up of one column of cores 3A, 3B, 3C, 3D; and other columns of cores 5A–5D, 7A–7D, and 9A–9D. The memory is of the conventional type found in the parametron art. The cores exhibit magnetic remanence and are driven to saturation in one direction to store a binary one and to saturation in the opposite direction to store a binary zero. Also shown in FIG. 1 is the read-write driver 11 and its driving line 13, which operatively links the read-write driver to every core in one column. As is conventional in the parametron art, the signals from read-write driver 11 are carefully timed in phase, amplitude, and frequency so that a second harmonic produced at each core will inherently have a phase indicative of the status of remanent magnetization of the core.

Each row of memory cores is magnetically linked by one of the sense lines 15A, 15B, 15C, or 15D to one of the parametrons 17A, 17B, 17C, and 17D. The parametrons 17A, 17B, 17C, and 17D comprise the input substages. Each input substage is operatively connected through one of conductive leads 18A, 18B, 18C, and 18D to one of the intermediate substages, comprised of parametrons 19A, 19B, 19C, and 19D. The intermediate substages are each operatively linked to the shift control substages 21A, 21B, 21C, and 21D, which are each comprised of one of a first group of parametrons 23A, 23B, 23C, and 23D, and one of a second group of parametrons 25A, 25B, 25C, and 25D.

Intermediate substage parametrons 19A–19D each connect in one sense to each one of shift control substage parametrons 23A–23D by conductive lines 27A, 27B, 27C, and 27D. Intermediate substage parametrons 19A–19D also each connect in an opposite sense to each one of the second shift control substage parametrons 25A–25D by oppositely wound conductive lines 29A, 29B, 29C, and 29D. The perpendicular line drawn through the conductive leads is intended to symbolize and distinguish the opposite direction of winding of that lead as compared to the direction of winding of other leads. The parametrons 23A, 23B, 23C, and 23D, one of the two parametrons in each shift control substage, are each connected to an input parametron different from the one which seeded that shift control substage by conductive leads 31A, 31B, 31C, and 31D. Thus, input parametron 17A is connected to the shift control substage parametron 23B by conductive lead 31B. The other stages are connected according to the same scheme. Each of the other of the two parametrons 25A, 25B, 25C, and 25D is connected by one of oppositely wound conductive leads 33A, 33B, 33C, and 33D, to the input parametron linked to the other parametron in one shift control substage. Thus, input parametron 17A is connected to the shift control substage parametron 25B by oppositely wound conductor 33B.

Figure 2:
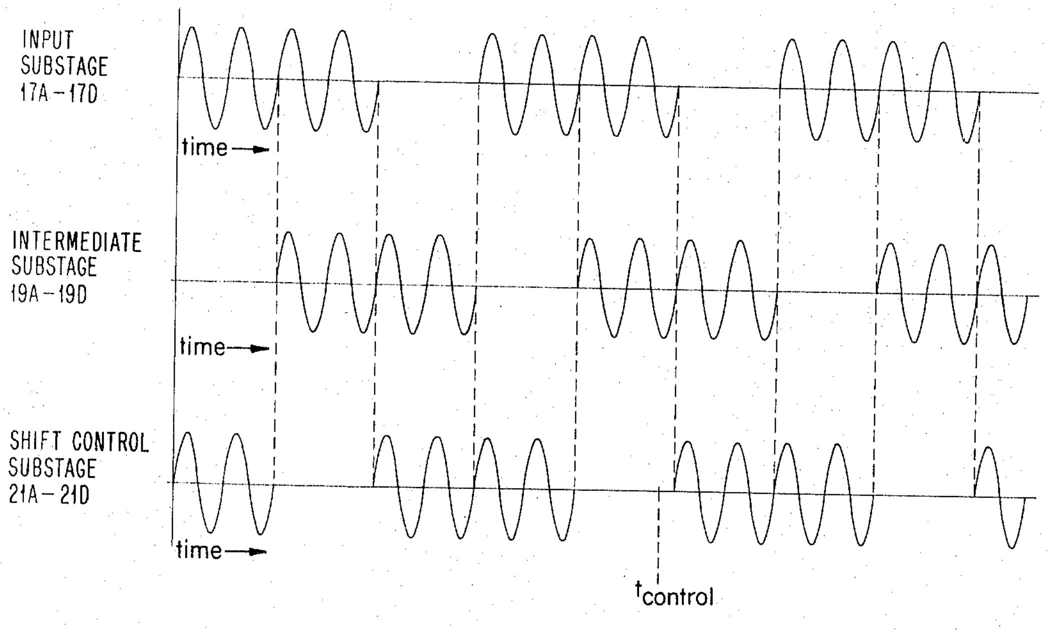
FIG. 2 illustrates the excitation timing of the parametron system.

The parametrons 23A–23D and 25A–25D all may be controlled in phase of signal stored by control signal lead 35. Data is read from the system at input parametron 17A by connecting read line 37, which is operatively connected to input parametron 17A and to any conventional data utilization circuit. Timing of the excitation of the parametrons is shown in FIG. 2.

The readout system of FIG. 1 functions as follows: At read time the input parametrons 17A–17D are excited. At the same time the read-write driver in a column is activated. FIG. 1 shows one read-write driver 11 driving one column of magnetic cores 5A–5D in the memory 1. Only one-half cycle of the signals on driving line 13 are inductively coupled to sense lines 15A–15D; and the half cycle so coupled is dependent upon the remanent state of each of the magnetic cores 5A–5D linking each of the sense windings 15A–15D. A signal of twice the driving frequency is created in the sense lines 15A–15D, the phase of which is indicative of the remanent status of the core inductively linked to the sense line. This conversion of magnetically stored data to phase coded signals is familiar to those skilled in the art.

Since the input parametrons 17A–17D are being excited, those parametrons could amplify and perpetuate the phase coded signals. It is necessary, however, to render the shift control substage parametrons 23A–23D and 25A–25D ineffective at this point in the readout sequence. As FIG. 2 shows, these parametrons are also excited during that time. Control signal lead 35 accomplishes the deactivation of the shift control parametrons by driving all of the shift control substage parametrons 23A–23D and 25A–25D so that they oscillate in the same phase. The two parametrons (such as 23B and 25B) in each shift control substage are connected to an input parametron (such as 17A) by oppositely wound leads (31B and 33B). The opposite polarities of the signals cancel and the shift control substage is ineffective during readout from memory to the input substage. Parametron 17A therefore responds to signals on sense line 15A, while the other parametrons respond likewise to signals on their associated sense lines. Parallel readout from one column in the memory is now complete, and a bit of data can be read on read line 37. The intermediate substage and the shift control substage serialize the data.

At a later time intermediate substage parametrons 19A–19D are excited. Since they are connected to the still excited input parametrons (see FIG. 2), the intermediate substage parametrons perpetuate and amplify the signal read out of memory.

At a later time the input substage parametrons 17A–17D are cleared by extinguishment of their excitation. At about the same time the shift control substage parametrons 23A–23D and 25A–25D, which had been cleared, are excited. At this time no control signal is effective on control signal lead 35. Due to the oppositely wound connections (such as 27B and 29B) between an intermediate substage (such as 19B) and the shift control substage parametrons (such as 23B and 25B), the two shift control substage parametrons (such as 23B and 25B) perpetuate and amplify signals indicative of the data read from memory but in opposite phase at each of the two parametrons in a shift control substage.

At a later time the cleared input substage parametrons 17A–17D are excited. The shift control substage parametrons 23A–23D and 25A–25D now dominate the seeding of the input substages. This is accomplished by the connections (such as conductive leads 31B and 33B) being oppositely wound. The associated parametrons (23B and 25B) were caused to oscillate in opposite phase in accordance with data extracted from the memory. The two signals add at the input parametron (17A) and seed that parametron to cause oscillation at a phase indicative of the data shifted from the preceding stage.

It should be clear that a general sequence of operation has been described which explains the entire operation of the system. A shifting stage is made up of an input parametron, an intermediate parametron, and a pair of shift control parametrons. Information is extracted from the memory in parallel while the shift control parametrons are rendered ineffective by a control signal. The information is shifted in parallel within each stage and then shifted in parallel from the shift control parametrons to a different stage. Phase coded data appears serially at read line 37. Any information in the input parametrons 17A–17D can be written back into memory at a row corresponding to its shifted location by causing read-write driver 11 to oscillate at a predetermined phase in a frequency one-half the data frequency. The addition of one frequency and twice that frequency to produce a directional peak in accordance with their relative phase to switch a magnetic core is a standard technique in the art.

Figure 3:
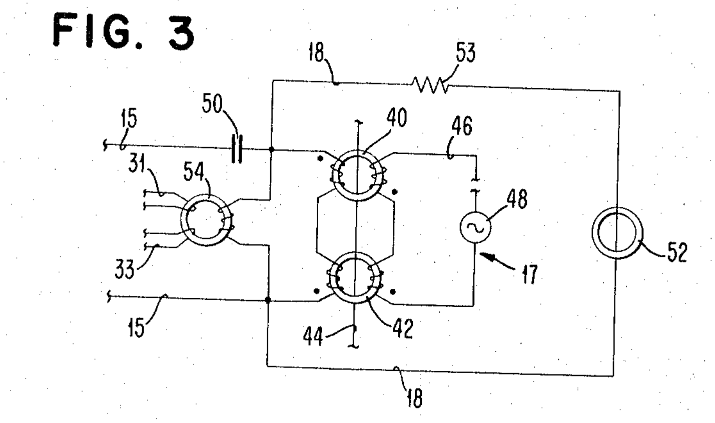
FIG. 3 shows the detailed structure of an input substage and its connections.
Figure 4:
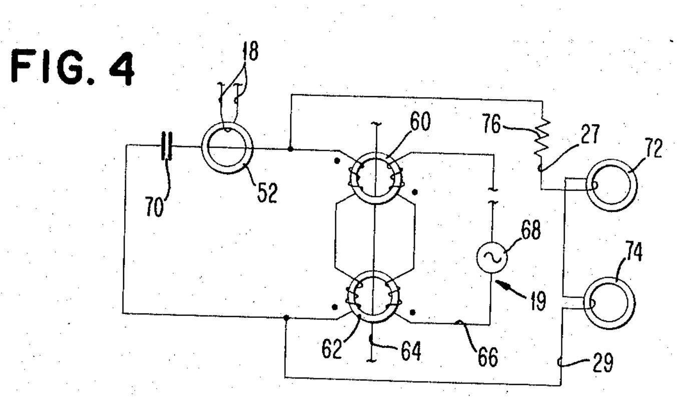
FIG. 4 shows the detailed structure of an intermediate substage and its interconnections.
Figure 5:
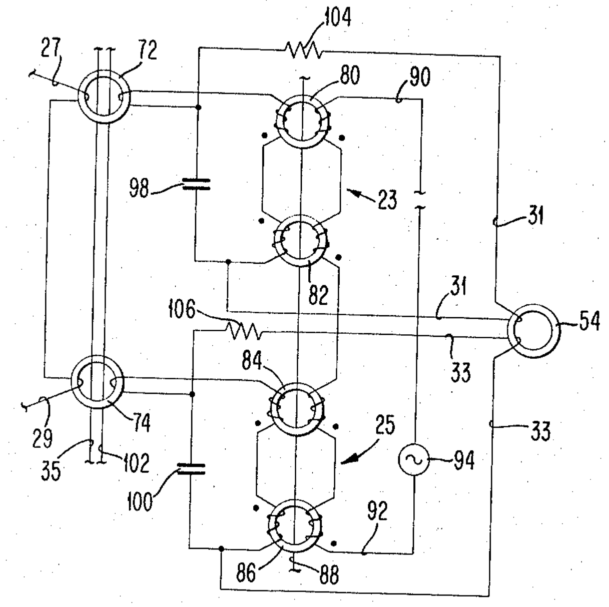
FIG. 5 shows the detailed structure of a shift control substage and its interconnections.

For an understanding of the details of the parametron assemblies used, reference is made to FIGS. 3, 4, and 5. Where appropriate, numerals identical to those in FIG. 1 are used, but any suffixes are deleted since FIGS. 3, 4, and 5 are illustrative of each of the three substages and thus could be any of those illustrated in FIG. 1.

FIG. 3 illustrates the input substage and its parametron 17. The sense line 15 is seen to wind in opposite sense through the two non-remanent cores 40 and 42 of a conventional parametron. The parametron 17 is further conventional in having a bias winding 44, additively wound excitation winding 46, an excitation source 48, and a capacitor 50 to tune the seed circuit to series resonance. The seed circuit is connected in parallel through line 18 to a seed core 52, which has no substantial remanence. A resistor 53 limits excess currents through the line 18. The seed circuit is also inductively linked for seeding by a second seed core 54, which has no substantial remanence and which is connected in parallel to the line 18. Seed core 54 is inductively coupled to lines 31 and 33. The lines 18, 31, and 33 are representative in general of the lines 31A–31D and 33A–33D, and 18A–18D of FIG. 1.

It should be apparent that the input substage of FIG. 3 operates in basically the same manner as a conventional parametron. A seed signal on line 15 is preserved and amplified when an excitation signal is active from excitation source 48. When the signals on lines 31 and 33 are of opposite sense, they cancel one another, and the parametron is controlled by information signals impressed on line 15 in the memory. As is made clear immediately below, the core 52 is connected to the intermediate substage, which is inactive during the time of readout from memory.

FIG. 4 illustrates the intermediate substage and its parametron 19. It, like the input parametron 17, is conventional in having two cores 60 and 62, a bias winding 64, an additively wound excitation winding 66, an excitation source 68, and a tuning capacitor 70. The core 52 of FIG. 3 is seen in FIG. 4 to link, through line 18, the seed circuit of the input substage parametron 17 to the seed circuit of the intermediate substage parametron 19. The connections to the two parametrons in each shift control substage through lines 27A–27D and 29A–29D shown in FIG. 1 is seen in FIG. 4 to be structurally implemented by connecting the lines 27 and 29 in parallel across the seed circuit of parametron 19 and in series oppositely wound through cores 72 and 74. The cores 72 and 74 interconnect with the shift control substage and will be more fully explained in connection with FIG. 5. The lines 27 and 29 also contain a resistor 76 to limit excess currents.

In operation the intermediate substage, as illustrated in FIG. 4, is seeded through seed core 52 by line 18, which is directly connected to an input parametron 17 (FIG. 3). The intermediate parametron is powered by its excitation source 60 after a phase coded signal has been established in the input substage in accordance with the timing of FIG. 2. The intermediate parametron 19, during its period of excitation, preserves and amplifies the signal, and the data bit is therefore not lost when the input substage is cleared by extinguishing the excitation power of the input substage parametron 17 (FIG. 3).

A shift control substage is shown in FIG. 5. It has two parametrons 23 and 25. Again, these parametrons are conventional in having cores 80, 82, 84 and 86, a bias winding 88, additively wound excitation windings 90, an excitation source 94, and tuning capacitors 98 and 100. The cores 72 and 74 are linked to the intermediate substage of FIG. 4 by series connected lines 27 and 29, and are each seen to be magnetically linked to one of each of the seed windings of the two parametrons 23 and 25. The connection of the shift control parametrons 23 and 25 to an input parametron of a different stage is seen to be by line 31, connected in parallel to the seed circuit of parametron 23, and line 33, connected in parallel to the seed circuit of parametron 27. The lines 31 and 33 link seed core 54 in oppositely wound sense. The lines 31 and 33 and the core 54 appear in FIG. 3, since they are the means by which a shift control substage connects with an input substage. The control signal lead 35 is connected to the seed cores 72 and 74. A continuous signal line 102 links the cores 72 and 74 and is wound in the same polarity as the control signal lead 35. Resistors 104 and 106 in lines 31 and 33 limit excess currents.

In operation, the control signal lead 35 carries a signal of phase additive to a continuous signal on line 102 when it is desired to force the two parametrons 23 and 25 to oscillate in the same phase. An oscillatory signal sufficient, when added to the signal on control signal lead 35, to overcome any signal on lines 27 and 29 exists continually on line 102. The control signal lead 35 is impressed with a signal identical in amplitude and opposite in phase to the signal on line 102 when it is desired that the parametrons 23 and 25 be seeded by an intermediate parametron through leads 27 and 29. The additive winding of lines 35 and 102 cancel at cores 72 and 74. The two parametrons 23 and 25 are thus seeded by the oppositely wound lines 27 and 29 and perpetuate and amplify a signal descriptive of the signal from the intermediate substage, but different in phase. FIG. 2 shows timing. As there indicated, a control signal should begin at least slightly before shift control substage excitation to insure proper control before the shift control substages build up and become self-sustaining. When the input substages are excited, the shift control substages control because the core 54 is linked by lines from the two parametrons 23 and 25 in opposite sense, and an additive signal thus results.

The entire structure of the preferred embodiment of the invention should now be clear. All of the substages are substantially identical to those shown illustratively in FIGS. 3, 4, and 5. All of the parametrons in each substage are excited in accordance with the timing of FIG. 2. In the preferred embodiment the control signal on control line 35 of FIG. 1 is a signal of opposite phase to the signal on line 102 when it is desired to allow the intermediate substage to seed the shift control substage. The control signal is a signal of the same phase prior to reading of information from memory so that the shift control substages are ineffective and the input substages will be seeded by the memory. Data is shifted through the substages and then to a different stage, all in parallel. As shown in FIG. 1, no data need be lost since the shift stages can be joined in a circular fashion by connecting the last stage of shift (21A) to the first stage (17D).

While the invention has been particularly shown and described with reference to a preferred embodiment thereof, it will be understood by those skilled in the art that the foregoing and other changes in form and details may be made therein without departing from the spirit and scope of the invention.

I claim:

1. A shift register for phase coded data comprising:
at least two input parametrons each adapted to register phase coded data,
at least two intermediate parametrons, one of each operatively connected to each said input parametron for transfer of phase coded data,
at least four shift control parametrons operatively connected in pairs to each said intermediate parametron for transfer of phase coded data,
each said pair of shift control parametrons being operatively connected to transfer data additively when said pair was seeded by its operatively connected intermediate parametron, said connection to transfer data additively being to an input parametron operatively connected through an intermediate parametron to a different shift control parametron,
means to excite all said input parametrons, and then to excite all said intermediate parametrons, and then to excite all said shift control parametrons respectively in overlapping, discontinuous sequence, and
means to control all said pairs of shift control parametrons to cause each said pair of shift control parametrons to oscillate in phases which will appear subtractively at the input parametron to which each shift control parametron is operatively connected.

2. The combination as in claim 1 wherein all said input parametrons are each linked to different cores of a memory matrix comprised of magnetic cores having remanence.

3. The combination as in claim 2 wherein each said intermediate parametron is operatively connected to one of a pair of shift control parametrons by a winding disposed in one polarity sense and to the other of said pair of shift control parametrons by a winding disposed in the opposite polarity sense, and each said pair of shift control parametrons is connected to said input parametron by one of said pair being connected by a winding disposed in one polarity sense and the other said shift control parametrons being connected by a winding of the opposite polarity sense.

4. The system as in claim 3 wherein said means to control all said pairs of shift control parametrons comprises means to cause both of said parametrons in a pair to oscillate with the same polarity.

5. In combination with a matrix memory of magnetic cores having remanence, readout and shifting means comprising stages, each stage comprising input, intermediate, and shift control parametrons:
a plurality of input parametrons with the seed circuit of each linking one row of said memory,
a plurality of intermediate parametrons with the seed circuit of each operatively coupled to the seed circuit of one input parametron,
a plurality of shift control parametrons, each intermediate parametron being coupled to the seed circuit of two of said shift control parametrons,
coupling means from the shift control parametrons of one stage to the seed circuit of an input parametron of a different stage wound additively when the shift control parametrons were seeded by an intermediate parametron,
and control means to force said shift control parametrons to oscillate such that signals appear on said coupling means in subtractive relationship.

6. The combination as in claim 5 also including a phase coded data readout connection operatively connected with one stage of said shifting means.

7. The combination as in claim 6 also including means to drive each column of said memory with a signal of twice the frequency of the data to be processed in phase code to cause phase coded signals to appear on said seed circuits linking the memory rows and to cause signals in said input parametrons to be written into memory.

No references cited.

BERNARD KONICK, *Primary Examiner.*

J. W. MOFFITT, *Assistant Examiner.*